US012368771B2

(12) United States Patent
Ojima et al.

(10) Patent No.: US 12,368,771 B2
(45) Date of Patent: Jul. 22, 2025

(54) ADAPTER DEVICE, FILE EXCHANGE SYSTEM, FILE EXCHANGE METHOD, AND COMPUTER-READABLE NON-TRANSITORY STORAGE MEDIUM WITH PROGRAM STORED THEREIN

(71) Applicant: HONDA MOTOR CO., LTD., Tokyo (JP)

(72) Inventors: Satoru Ojima, Tokyo (JP); Katsunori Taguchi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/977,086

(22) Filed: Oct. 31, 2022

(65) Prior Publication Data

US 2023/0142067 A1 May 11, 2023

(30) Foreign Application Priority Data

Nov. 5, 2021 (JP) .................................. 2021-181258

(51) Int. Cl.
*G06F 15/167* (2006.01)
*G06F 16/176* (2019.01)
*H04L 67/06* (2022.01)

(52) U.S. Cl.
CPC ............ *H04L 67/06* (2013.01); *G06F 16/176* (2019.01)

(58) Field of Classification Search
CPC ...... G06F 16/176; G06F 16/182; G06F 16/13; G06F 16/10; H04L 67/06; H04L 67/01
See application file for complete search history.

(56) References Cited

U.S. PATENT DOCUMENTS 6,718,372 B1 * 4/2004 Bober ................... G06F 16/183
709/219
9,251,114 B1 * 2/2016 Ancin ..................... H04L 63/10
(Continued)

FOREIGN PATENT DOCUMENTS

JP H09-231114 A 9/1997
JP H11-134227 A 5/1999
(Continued)

OTHER PUBLICATIONS

Office Action dated Oct. 29, 2024 issued in the corresponding Japanese Patent Application No. 2021-181258 A with the English machine translation thereof.
(Continued)

*Primary Examiner* — Suraj M Joshi
*Assistant Examiner* — Hao H Nguyen
(74) *Attorney, Agent, or Firm* — Carrier, Shende & Associates P.C.; Joseph P. Carrier; Jeffrey T. Gedeon

(57) ABSTRACT

An adapter device is equipped with a communication unit configured to carry out communications with a file exchange device on the basis of a predetermined communication protocol, a transmission processing unit which, in the case that transmission target file serving as an object to be transmitted has been written into a shared directory, is configured to transmit a transmission file corresponding to the transmission target file to the file exchange device via the communication unit, and a reception processing unit which, in the case that a reception file has been received from the file exchange device via the communication unit, is configured to write a received file corresponding to the reception file within the shared directory.

12 Claims, 8 Drawing Sheets

(56) References Cited

U.S. PATENT DOCUMENTS

| | | | |
|---|---|---|---|
| 2001/0002470 A1* | 5/2001 | Inohara | G06F 16/116 |
| 2001/0028363 A1* | 10/2001 | Nomoto | G06F 16/10 |
| | | | 715/205 |
| 2007/0130143 A1* | 6/2007 | Zhang | G06F 16/972 |
| 2011/0029619 A1* | 2/2011 | Bai | H04L 51/046 |
| | | | 709/227 |
| 2011/0202627 A1* | 8/2011 | Nakayama | H04N 1/00127 |
| | | | 709/217 |
| 2012/0203850 A1* | 8/2012 | Luo | H04L 51/04 |
| | | | 709/206 |
| 2013/0061173 A1* | 3/2013 | Tomita | G06F 16/176 |
| | | | 715/810 |
| 2016/0132528 A1* | 5/2016 | Roubaud | G06F 16/156 |
| | | | 707/626 |
| 2016/0292193 A1* | 10/2016 | Madanapalli | G06F 21/6218 |
| 2017/0124111 A1* | 5/2017 | Sharma | G06F 16/178 |
| 2017/0177613 A1* | 6/2017 | Sharma | G06F 21/45 |
| 2017/0192979 A1* | 7/2017 | Yang | G06F 16/182 |
| 2017/0286698 A1* | 10/2017 | Shetty | H04L 67/10 |
| 2018/0165298 A1* | 6/2018 | Koos | G06F 16/23 |
| 2019/0007479 A1* | 1/2019 | Shi | H04W 4/20 |
| 2020/0201823 A1* | 6/2020 | Meschkat | G06F 16/176 |
| 2020/0228580 A1* | 7/2020 | Choi | H04L 12/1813 |
| 2021/0240578 A1* | 8/2021 | Zhang | G06F 11/1466 |
| 2021/0281631 A1* | 9/2021 | Lopez | H04L 63/0428 |
| 2024/0111733 A1* | 4/2024 | Pathak | G06F 16/188 |

FOREIGN PATENT DOCUMENTS

| | | | |
|---|---|---|---|
| JP | 2003-006031 A | | 1/2003 |
| JP | 2003-529823 A | | 10/2003 |
| JP | 2004-126715 A | | 4/2004 |
| JP | 2006155576 A | * | 6/2006 |
| JP | 2011-172229 A | | 9/2011 |
| JP | 2013-232086 A | | 11/2013 |
| JP | 2019-507409 A | | 3/2019 |
| JP | 2021-128679 A | | 9/2021 |

OTHER PUBLICATIONS

Office Action dated Feb. 25, 2025 issued in the corresponding Japanese Patent Application No. 2021-181258 with the English machine translation thereof.

\* cited by examiner

FIG. 3A

| | TYPE CODE | DESTINATION CODE | YEAR | MONTH | DAY | HOUR | MINUTE | SECOND | MANAGEMENT NUMBER | FREE |
|---|---|---|---|---|---|---|---|---|---|---|
| 110 — TRANSMISSION COMMENT FILE | CHX0000000 | YYYY | MM | DD | hh | mm | ss | NNNN | X······X |
| 112 — TRANSMISSION TARGET DATA FILE | DHX0000000 | YYYY | MM | DD | hh | mm | ss | NNNN | X······X |
| 114 — TRANSMISSION TOKEN FILE | XHX0000000 | YYYY | MM | DD | hh | mm | ss | NNNN | X······X |

FIG. 3B

| | TYPE CODE | DESTINATION CODE | YEAR | MONTH | DAY | HOUR | MINUTE | SECOND | MANAGEMENT NUMBER | FREE |
|---|---|---|---|---|---|---|---|---|---|---|
| 115 — TRANSMISSION ACK FILE | AHX0000000 | YYYY | MM | DD | hh | mm | ss | NNNN | X······X |
| 113 — TRANSMISSION ACK TOKEN FILE | XHX0000000 | YYYY | MM | DD | hh | mm | ss | NNNN | X······X |

FIG. 5A

| | TYPE CODE | DESTINATION CODE | YEAR | MONTH | DAY | HOUR | MINUTE | SECOND | MANAGEMENT NUMBER | FREE |
|---|---|---|---|---|---|---|---|---|---|---|
| 118 — RECEPTION COMMENT FILE | CHGT00000 | YYYY | MM | DD | hh | mm | ss | NNNN | X------X |
| 120 — RECEIVED DATA FILE | DHGT00000 | YYYY | MM | DD | hh | mm | ss | NNNN | X------X |
| 122 — RECEPTION TOKEN FILE | XHGT00000 | YYYY | MM | DD | hh | mm | ss | NNNN | X------X |

FIG. 5B

| | TYPE CODE | DESTINATION CODE | YEAR | MONTH | DAY | HOUR | MINUTE | SECOND | MANAGEMENT NUMBER | FREE |
|---|---|---|---|---|---|---|---|---|---|---|
| 124 — RECEPTION ACK FILE | AHGT00000 | YYYY | MM | DD | hh | mm | ss | NNNN | X------X |
| 123 — RECEPTION ACK TOKEN FILE | XHGT00000 | YYYY | MM | DD | hh | mm | ss | NNNN | X------X |

ADAPTER DEVICE, FILE EXCHANGE SYSTEM, FILE EXCHANGE METHOD, AND COMPUTER-READABLE NON-TRANSITORY STORAGE MEDIUM WITH PROGRAM STORED THEREIN

CROSS-REFERENCE TO RELATED APPLICATIONS

This application is based upon and claims the benefit of priority from Japanese Patent Application No. 2021-181258 filed on Nov. 5, 2021, the contents of which are incorporated herein by reference.

BACKGROUND OF THE INVENTION

Field of the Invention

The present invention relates to an adapter device, a file exchange system, a file exchange method, and a computer-readable non-transitory storage medium having a program stored therein.

Description of the Related Art

In JP 2003-006031 A, a file exchange system is disclosed which is capable of exchanging data files via a data server connected to a network.

SUMMARY OF THE INVENTION

However, cases are known in which updating of the file exchange device that constitutes the file exchange system is carried out. In the case that updating of the file exchange device is performed, updating of each of a plurality of devices that perform communications with the file exchange device must also be carried out. Updating of each of the plurality of devices requires an enormous cost. Further, when each of such devices is updated, a concern arises in that a security defect or the like may occur.

The present invention has the object of solving the aforementioned problem.

An adapter device according to one aspect of the present invention includes a communication unit configured to carry out communications with a file exchange device on a basis of a predetermined communication protocol, a transmission processing unit which is configured to transmit, in a case that a transmission target file serving as an object to be transmitted has been written into a shared directory, a transmission file corresponding to the transmission target file to the file exchange device via the communication unit, and a reception processing unit which is configured to write, in a case that a reception file has been received from the file exchange device via the communication unit, a received file corresponding to the reception file within the shared directory.

A file exchange system according to another aspect of the present invention is a file exchange system configured to carry out transmission and reception of files between one user and another user using a file exchange device, including an apparatus operated by the one user, and an adapter device including a communication unit configured to carry out communications with the file exchange device on a basis of a predetermined communication protocol, wherein the apparatus is equipped with a writing unit configured to write a transmission target file, which is a file serving as an object to be transmitted, in a shared directory, and the adapter device is equipped with a transmission processing unit which is configured to transmit, in a case that the transmission target file has been written into the shared directory, a transmission file corresponding to the transmission target file to the file exchange device via the communication unit.

A file exchange method according to still another aspect of the present invention includes a step of confirming whether or not a transmission target file serving as an object to be transmitted has been written into a shared directory, and a step of transmitting, in a case that the transmission target file has been written into the shared directory, a transmission file corresponding to the transmission target file to a file exchange device via a communication unit on a basis of a predetermined communication protocol.

In a computer-readable non-transitory storage medium having a program stored therein according to still another aspect of the present invention, the program is stored in order to cause a computer to execute a process including a step of confirming whether or not a transmission target file serving as an object to be transmitted has been written into a shared directory, and a step of transmitting a transmission file corresponding to the transmission target file to a file exchange device via a communication unit on a basis of a predetermined communication protocol, in a case that the transmission target file has been written into the shared directory.

According to the present invention, it is possible to provide an adapter device, a file exchange system, a file exchange method, and a computer-readable non-transitory storage medium having a program stored therein, which are capable of responding satisfactorily to updating of the file exchange device.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3A and FIG. 3B are diagrams showing examples of file names;

FIG. 5A and FIG. 5B are diagrams showing examples of file names;

DESCRIPTION OF THE INVENTION

Embodiment

Figure 1:
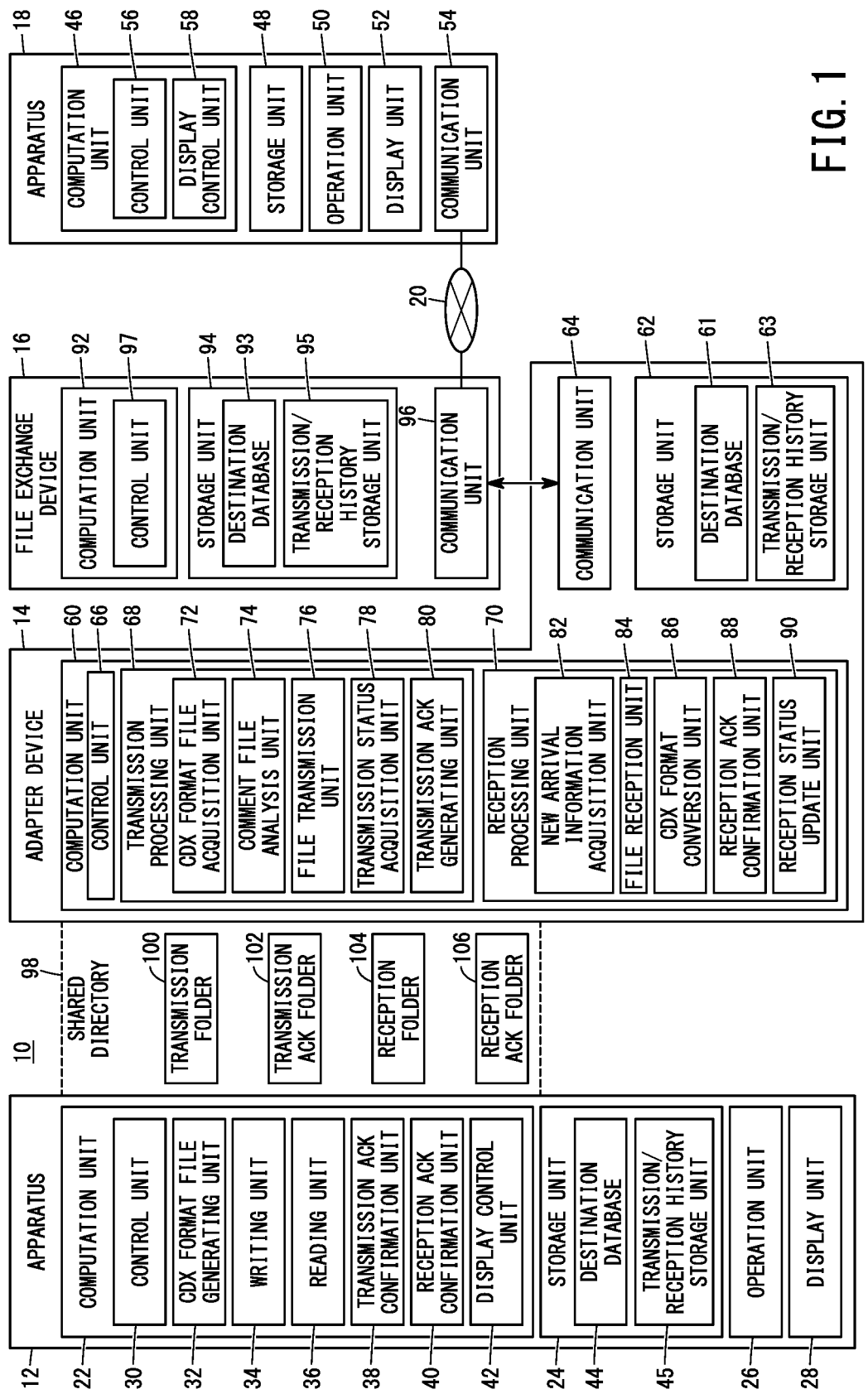
FIG. 1 is a block diagram showing a file exchange system according to an embodiment of the present invention.

A description will be given with reference to FIGS. 1 to 8 concerning an adapter device, a file exchange system, a file exchange method, and a computer-readable non-transitory storage medium having a program stored therein according to one embodiment of the present invention. FIG. 1 is a block diagram showing a file exchange system according to an embodiment of the present invention.

A file exchange system 10 according to the present embodiment carries out transmission and reception of files between one user and another user using a file exchange device 16.

The file exchange system 10 can be constituted by an apparatus 12, an adapter device 14, the file exchange device 16, and an apparatus 18.

The apparatus 12 is provided, for example, in a certain office of a certain company. The user of the apparatus 12, for example, is an employee or the like who works at the office where the apparatus 12 is provided.

The apparatus 18 is provided, for example, at a client (business partner) of the company in which the apparatus 12 is provided. The user of the apparatus 18, for example, is an employee or the like who works for the business partner.

Exchange of files in which the file exchange device 16 is used can be performed between the user operating the apparatus 12 and the user operating the apparatus 18.

A first office from among a plurality of offices belonging to a certain company may be equipped with the apparatus 12, and a second office from among a plurality of such offices may be equipped with the apparatus 18.

The apparatus 12 may be located in a first country, and the apparatus 18 may be located in a second country that differs from the first country.

The apparatus 12 may be equipped with a computation unit 22, a storage unit 24, an operation unit 26, and a display unit 28. It should be noted that although the apparatus 12 may comprise constituent elements other than these constituent elements, descriptions of such other elements are omitted herein. For example, at least a portion of the apparatus 12 may be constituted by a server or the like, which is provided externally of the office in which the apparatus 12 is provided.

The computation unit 22 may be constituted by a processor such as a CPU (Central Processing Unit), a GPU (Graphics Processing Unit), or the like, and more specifically, by processing circuitry.

The computation unit 22 may comprise a control unit 30, a CDX format file generating unit 32, a writing unit 34, a reading unit 36, a transmission ACK confirmation unit 38, a reception ACK generating unit 40, and a display control unit 42. The control unit 30, the CDX format file generating unit 32, the writing unit 34, the reading unit 36, the transmission ACK confirmation unit 38, the reception ACK generating unit 40, and the display control unit 42 can be realized by programs stored in the storage unit 24 being executed by the computation unit 22. Moreover, it should be noted that although the computation unit 22 may comprise constituent elements other than these constituent elements, descriptions of such other elements are omitted herein.

Moreover, at least a portion of the control unit 30, the CDX format file generating unit 32, the writing unit 34, the reading unit 36, the transmission ACK confirmation unit 38, the reception ACK generating unit 40, and the display control unit 42 may be realized by an integrated circuit such as an ASIC (Application Specific Integrated Circuit), an FPGA (Field-Programmable Gate Array), or the like. Further, at least a portion of the control unit 30, the CDX format file generating unit 32, the writing unit 34, the reading unit 36, the transmission ACK confirmation unit 38, the reception ACK generating unit 40, and the display control unit 42 may be constituted by an electronic circuit including a discrete device.

The storage unit 24 may comprise a non-illustrated volatile memory and a non-illustrated non-volatile memory. As the volatile memory, there may be cited, for example, a RAM (Random Access Memory). The volatile memory is used as a working memory of a processor, and temporarily stores data or the like required for processing or calculations. As the non-volatile memory, there may be cited, for example, a ROM (Read Only Memory), a flash memory, or the like. The non-volatile memory is used as a storage memory, and stores therein programs, tables, maps, and the like. At least a portion of the storage unit 24 may be provided in the processor, the integrated circuit, or the like, which were described above. Further, the storage unit 24 may further be equipped with an HDD (Hard Disk Drive), an SSD (Solid State Drive), or the like. Various applications (application programs) can be installed in the storage unit 24. For example, a CAD (Computer-Aided Design) application or the like can be installed in the storage unit 24. Further, in the storage unit 24, there may be provided a destination database 44, or stated otherwise, a destination DB. The storage unit 24 may further be equipped with a transmission/reception history storage unit 45. Information indicating a destination (transmission destination) of the files is stored in the destination database 44. A transmission/reception history, which is a history of file transmissions and receptions of files, is stored in the transmission/reception history storage unit 45. The transmission/reception history includes transmission/reception management numbers that are sequentially attached with respect to the transmission and the reception of the files, and information indicative of the status of the transmission/reception. The transmission/reception history is retained inside the transmission/reception history storage unit 45, even after the transmission/reception of the files is completed, in order to enable tracking in the event of a confidentiality leakage.

The operation unit 26 can be used when the user performs an operation input with respect to the apparatus 12. As the operation unit 26, there may be cited a keyboard, a mouse, or the like, although the present invention is not limited to this feature. A non-illustrated display element may be provided in the display unit 28. As such a display element, there may be used, for example, a liquid crystal display element, an organic electroluminescence display element, or the like. The operation unit 26 and the display unit 28 may be constituted by a non-illustrated touch panel that is equipped with such a display element.

The apparatus 18 may be equipped with a computation unit 46, a storage unit 48, an operation unit 50, a display unit 52, and a communication unit 54. It should be noted that although the apparatus 18 may comprise constituent elements other than these constituent elements, descriptions of such other elements are omitted herein.

The computation unit 46 may be constituted by a processor such as a CPU, a GPU, or the like, and more specifically, by processing circuitry. The computation unit 46 may be equipped with a control unit 56 and a display control unit 58. The control unit 56 and the display control unit 58 can be realized by programs stored in the storage unit 48 being executed by the computation unit 46. Moreover, it should be noted that although the computation unit 46 may comprise constituent elements other than these constituent elements, descriptions of such other elements are omitted herein. The control unit 56 administers the control of the apparatus 18 as a whole. The display control unit 58 is capable of controlling a screen display of the display unit 52. Moreover, at least a portion of the control unit 56 and the display control unit 58 may be realized by an integrated circuit such as an ASIC, an FPGA, or the like. Further, at least a portion of the control unit 56 and the display control unit 58 may be constituted by an electronic circuit including a discrete device.

The storage unit 48 may comprise a non-illustrated volatile memory and a non-illustrated non-volatile memory. Further, the storage unit 48 may further be equipped with an HDD, an SSD, or the like.

The operation unit 50 can be used when the user performs an operation input with respect to the apparatus 18. As the operation unit 50, there may be cited a keyboard, a mouse, or the like, although the present invention is not limited to this feature. A non-illustrated display element may be provided in the display unit 52.

The communication unit 54 is equipped with, for example, a non-illustrated communication module. The communication unit 54 can carry out transmission and reception of data to and from a later-described communication unit 96 via a network 20 such as the Internet or the like.

The adapter device 14 may be equipped with a computation unit 60, a storage unit 62, and a communication unit 64. It should be noted that although the adapter device 14 may comprise constituent elements other than these constituent elements, descriptions of such other elements are omitted herein.

The computation unit 60 may be constituted by a processor such as a CPU, a GPU, or the like, and more specifically, by processing circuitry.

The storage unit 62 may comprise a non-illustrated volatile memory and a non-illustrated non-volatile memory. Further, the storage unit 62 may further be equipped with an HDD, an SSD, or the like. Further, the storage unit 62 may be equipped with a destination database 61, and a transmission/reception history storage unit 63. Information indicating a destination of the files is stored in the destination database 61. A transmission/reception history is stored in the transmission/reception history storage unit 63. The transmission/reception history includes transmission/reception management numbers that are sequentially attached with respect to the transmission and the reception of the files, and the status of the transmission/reception. The transmission/reception history is retained within the transmission/reception history storage unit 63, even after the transmission/reception of the files is completed, in order to enable tracking in the event of a confidentiality leakage.

The communication unit 64 is equipped with, for example, a non-illustrated communication module. The communication unit 64 can carry out transmission and reception of data to and from the communication unit 96 via a non-illustrated network or the like.

The computation unit 60 may be equipped with a control unit 66, a transmission processing unit 68, and a reception processing unit 70. The control unit 66, the transmission processing unit 68, and the reception processing unit 70 can be realized by programs stored in the storage unit 62 being executed by the computation unit 60. Moreover, it should be noted that although the computation unit 60 may comprise constituent elements other than these constituent elements, descriptions of such other elements are omitted herein. Moreover, at least a portion of the control unit 66, the transmission processing unit 68, and the reception processing unit 70 may be realized by an integrated circuit such as an ASIC, an FPGA, or the like. Further, at least a portion of the control unit 66, the transmission processing unit 68, and the reception processing unit 70 may be constituted by an electronic circuit including a discrete device.

The transmission processing unit 68 may be equipped with a CDX format file acquisition unit 72, a comment file analysis unit 74, a file transmission unit 76, a transmission status acquisition unit 78, and a transmission ACK generating unit 80. The CDX format file acquisition unit 72, the comment file analysis unit 74, the file transmission unit 76, the transmission status acquisition unit 78, and the transmission ACK generating unit 80 can be realized by programs stored in the storage unit 62 being executed by the computation unit 60.

The reception processing unit 70 may comprise a new arrival information acquisition unit 82, a file reception unit 84, a CDX format conversion unit 86, a reception ACK confirmation unit 88, and a reception status update unit 90. The new arrival information acquisition unit 82, the file reception unit 84, the CDX format conversion unit 86, the reception ACK confirmation unit 88, and the reception status update unit 90 can be realized by programs stored in the storage unit 62 being executed by the computation unit 60.

The file exchange device 16 may be equipped with a computation unit 92, a storage unit 94, and the communication unit 96. It should be noted that although the file exchange device 16 may comprise constituent elements other than these constituent elements, descriptions of such other elements are omitted herein.

The computation unit 92 may be constituted by a processor such as a CPU, a GPU, or the like, and more specifically, by processing circuitry. The computation unit 92 may be equipped with a control unit 97. The control unit 97 administers the control of the file exchange device 16 as a whole. Moreover, at least a portion of the control unit 97 may be realized by an integrated circuit such as an ASIC, an FPGA, or the like. Further, at least a portion of the control unit 97 may be constituted by an electronic circuit including a discrete device.

The storage unit 94 may comprise a non-illustrated volatile memory and a non-illustrated non-volatile memory. Further, the storage unit 94 may further be equipped with an HDD, an SSD, or the like. Further, the storage unit 94 may be equipped with a destination database 93, and a transmission/reception history storage unit 95. Information indicating a destination of the files is stored in the destination database 93. A transmission/reception history is stored in the transmission/reception history storage unit 95. The transmission/reception history includes transmission/reception management numbers that are sequentially attached with respect to the transmission and the reception of the files, and the status of the transmission/reception. The transmission/reception history is retained within the transmission/reception history storage unit 95, even after the transmission/reception of the files is completed, in order to enable tracking in the event of a confidentiality leakage.

The communication unit 96 is equipped with, for example, a non-illustrated communication module. The communication unit 96 can carry out transmission and reception of data to and from the communication unit 54 via the network 20 such as the Internet or the like. Further, the communication unit 96 can carry out transmission and reception of data to and from the communication unit 64 via a non-illustrated network.

A shared directory 98 can be set, for example, in a non-illustrated storage unit (storage) provided in a non-illustrated NFS (Network File System) server. In accordance with such an NFS, a storage area corresponding to the shared directory 98 is mounted in a local storage constituted by the storage unit 24. Further, in accordance with such an NFS, a storage area corresponding to the shared directory 98 is mounted in a local storage constituted by the storage unit 62. The apparatus 12 and the adapter device 14 are each capable of accessing the shared directory 98, respectively.

A transmission folder 100, a transmission ACK folder 102, a reception folder 104, and a reception ACK folder 106 may be provided in the shared directory 98.

As noted previously, the apparatus 12 may be equipped with the control unit 30. The control unit 30 administers the control of the apparatus 12 as a whole.

Figure 2A:
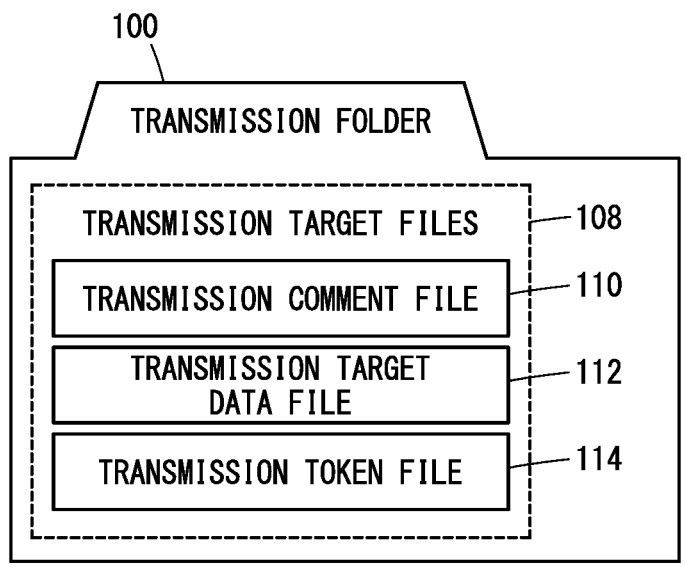
FIG. 2A is a diagram conceptually illustrating an example of transmission target files.

As noted previously, the apparatus 12 may be equipped with the CDX format file generating unit 32. The CDX format file generating unit 32 generates transmission target files 108, which are files serving as an object to be transmitted. FIG. 2A is a diagram conceptually illustrating an example of the transmission target files. In FIG. 2A, a state is shown conceptually in which the transmission target files 108 are written into the transmission folder 100. As shown in FIG. 2A, the transmission target files 108 include a transmission comment file 110, a transmission target data file 112, and a transmission token file 114. The transmission target data file 112 includes transmission target data, which is data serving as an object to be transmitted. The transmission target data may include, for example, CAD data which is data generated by CAD (Computer-Aided Design), although the present invention is not limited to this feature. The transmission comment file 110 includes comments (comment information) concerning the transmission target data. Destination information indicating a destination of the transmission target files 108 may be included in the transmission comment file 110. Further, transmission source information (or sender information) indicating the transmission source of the transmission target files 108 may be included in the transmission comment file 110. The transmission token file 114 contains authentication information. The transmission token file 114 fulfills a roll of indicating that both writing of the transmission comment file 110 to the transmission folder 100, and writing of the transmission target data file 112 to the transmission folder 100 have been completed. Therefore, writing of the transmission token file 114 to the transmission folder 100 is performed after writing of the transmission comment file 110 in the transmission folder 100 and writing of the transmission target data file 112 in the transmission folder 100 have been completed.

At the beginning of the file name of the transmission comment file 110, a type code "C" is appended thereto, as will be described later. At the beginning of the file name of the transmission target data file 112, a type code "D" is listed, as will be described later. At the beginning of the file name of the transmission token file 114, a type code "X" is listed, as will be described later. For this purpose, a file with such a configuration may be referred to as a CDX format file. These files 110, 112, and 114 that make up the transmission target files 108 which are in a CDX format are associated with one another.

FIG. 3A is a diagram showing examples of the file names. The file name of the transmission comment file 110, the file name of the transmission target data file 112, and the file name of the transmission token file 114 are shown in FIG. 3A.

As shown in FIG. 3A, the file names can be constituted by a type code, a destination code, date and time information, a management number, and free information. The type code is information indicating a type of file. The type code is listed at the beginning of the file name. The type code of the transmission comment file 110 is "C". The type code of the transmission target data file 112 is "D". The type code of the transmission token file 114 is "X".

The destination code is information indicating a destination (transmission destination) of a file. Destination codes corresponding to each of respective destinations are stored in the destination database 44.

The date and time information is information indicating the date and time (year, month, day, hour, minute, second) when the transmission target data file 112 was generated.

The destination code and the date and time information in the transmission comment file 110 corresponding to the transmission target data file 112 coincide with the destination code and the date and time information in the transmission target data file 112. Further, the destination code and the date and time information in the transmission token file 114 corresponding to the transmission target data file 112 coincide with the destination code and the date and time information in the transmission target data file 112. These three files 110, 112, and 114 are associated with each other due to the information contained within their file names coinciding with each other.

As noted previously, the apparatus 12 may be equipped with the writing unit 34. The writing unit 34 writes the transmission target files 108 generated by the CDX format file generating unit 32 into the transmission folder 100. More specifically, the writing unit 34 writes the transmission target files 108 which are in a CDX format into the transmission folder 100.

Figure 2B:
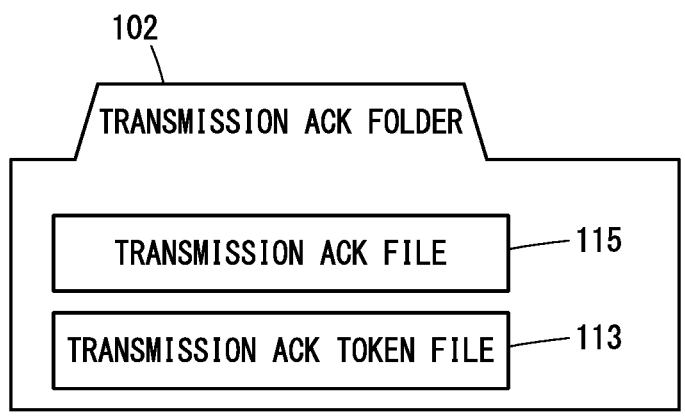
FIG. 2B is a diagram conceptually illustrating an example of a transmission ACK file and a transmission ACK token file.

As noted previously, the apparatus 12 may be equipped with the reading unit 36. The reading unit 36 confirms whether or not a transmission ACK token file 113 is written into the transmission ACK folder 102. FIG. 2B is a diagram conceptually illustrating an example of the transmission ACK file and the transmission ACK token file. In FIG. 2B, a state is shown conceptually in which a transmission ACK file 115 and the transmission ACK token file 113 are written into the transmission ACK folder 102. The transmission ACK file 115 and the transmission ACK token file 113 are written into the transmission ACK folder 102 by the adapter device 14, as will be described later. The transmission ACK token file 113 fulfills a role of indicating that writing of the transmission ACK file 115 to the transmission ACK folder 102 has been completed. Therefore, writing of the transmission ACK token file 113 to the transmission ACK folder 102 is performed after writing of the transmission ACK file 115 to the transmission ACK folder 102 has been completed. In the case that the transmission ACK token file 113 is written into the transmission ACK folder 102, the reading unit 36 reads out the transmission ACK file 115 that is written into the transmission ACK folder 102. The transmission ACK file 115 contains a status code indicating the status of the transmission of the files. The reading unit 36 repeats the process of reading out from the transmission ACK folder 102, until the transmission ACK file 115 containing a status code indicating that the transmission of the files has been completed, or alternatively, until the transmission ACK file 115 indicating that a status code indicative of the fact that an error has occurred in the transmission of the files is obtained.

FIG. 3B is a diagram showing examples of file names. The file name of the transmission ACK file 115 and the file name of the transmission ACK token file 113 are shown in FIG. 3B.

As shown in FIG. 3B, the file names can be constituted by a type code, a destination code, date and time information, a management number, and free information. The type code of the transmission ACK file 115 is "A". The type code of the transmission ACK token file 113 is "X". The destination code and the date and time information in the files 110, 112, and 114, which make up the transmission target files 108, and the destination code and the date and time information in the transmission ACK file 115, which is generated when the transmission of transmission files 1081 (refer to FIG. 6A) corresponding to the transmission target files 108 is completed, coincide with each other. Further, the destination code and the date and time information in the transmission ACK token file 113 corresponding to the transmission ACK file 115 coincide with the destination code and the date and time information in the transmission ACK file 115. The transmission ACK file 115 and the transmission ACK token file 113 are associated with each other due to the information contained in their file names coinciding with each other.

As noted previously, the transmission ACK confirmation unit 38 may be provided in the apparatus 12. The transmission ACK confirmation unit 38 confirms the transmission ACK file 115 which is read out by the reading unit 36 from the transmission ACK folder 102. In the case that the destination code and the date and time information in the transmission ACK file 115 coincide with the destination code and the date and time information in the files 110, 112, and 114 that make up the transmission target files 108, and a status code indicating that the transmission of the files has been completed is included in the transmission ACK file 115, the transmission ACK confirmation unit 38 performs the following process. More specifically, in such a case, the transmission ACK confirmation unit 38 determines that the transmission of the transmission files 1081 corresponding to the transmission target files 108 has been completed.

Figure 4A:
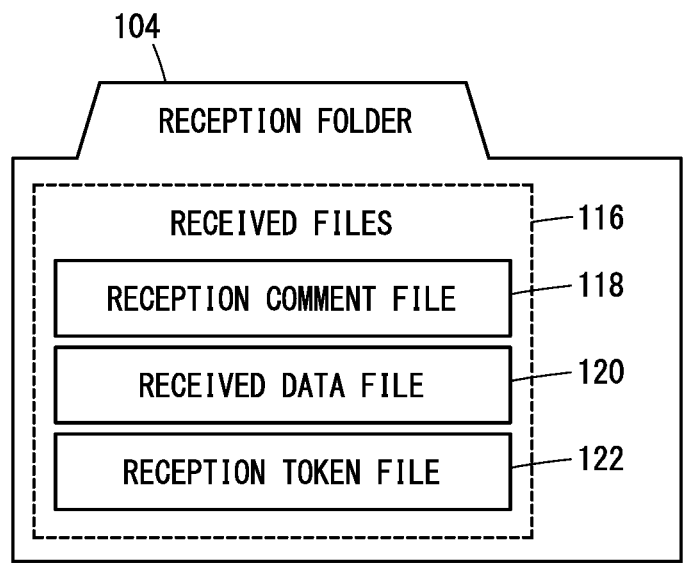
FIG. 4A is a diagram conceptually illustrating an example of received files.

The reading unit 36 can read out received files 116, to be described later, which are written into the reception folder 104. Moreover, as will be described later, the received files 116 are written into the reception folder 104 by the adapter device 14. FIG. 4A is a diagram conceptually illustrating an example of the received files. In FIG. 4A, a state is shown conceptually in which the received files 116 are written into the reception folder 104. As shown in FIG. 4A, the received files 116 include a reception comment file 118, a received data file 120, and a reception token file 122. The received data file 120 includes received data, which is data that has been received. The reception comment file 118 includes comments concerning the received data. Destination information indicating a destination of the received files 116 may be included in the reception comment file 118. Further, source information indicating the source of the received files 116 may be included in the reception comment file 118. The reception token file 122 contains authentication information.

At the beginning of the file name of the reception comment file 118, a type code "C" is appended thereto, as will be described later. At the beginning of the file name of the received data file 120, a type code "D" is listed, as will be described later. At the beginning of the file name of the reception token file 122, a type code "X" is listed, as will be described later. As noted previously, the files of such a format may be referred to as CDX format files. These files 118, 120, and 122 that make up the received files 116 which are in a CDX format are associated with one another.

FIG. 5A is a diagram showing examples of the file names. The file name of the reception comment file 118, the file name of the received data file 120, and the file name of the reception token file 122 are shown in FIG. 5A.

As shown in FIG. 5A, the file names can be constituted by a type code, a destination code, date and time information, a management number, and free information. The type code of the reception comment file 118 is "C". The type code of the received data file 120 is "D". The type code of the reception token file 122 is "X". The destination code and the date and time information in the reception comment file 118 corresponding to the received data file 120 coincide with the destination code and the date and time information in the received data file 120. Further, the destination code and the date and time information in the reception token file 122 corresponding to the received data file 120 coincide with the destination code and the date and time information in the received data file 120. These three files 118, 120, and 122 are associated with each other due to the information contained within their file names coinciding with each other.

Figure 4B:
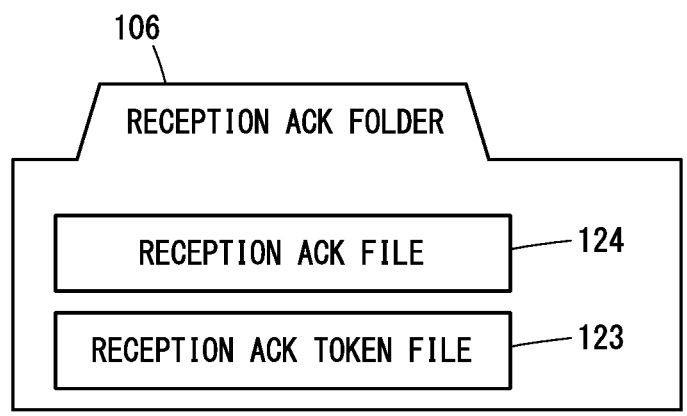
FIG. 4B is a diagram conceptually illustrating an example of a reception ACK file and a reception ACK token file.

As noted previously, the reception ACK generating unit 40 may be provided in the apparatus 12. The reception ACK generating unit 40 generates a reception ACK file 124 corresponding to the received files 116 that are read out from the reception folder 104 by the reading unit 36. FIG. 4B is a diagram conceptually illustrating an example of the reception ACK file and the reception ACK token file. In FIG. 4B, a state is shown conceptually in which the reception ACK file 124 and a reception ACK token file 123 are written into the reception ACK folder 106. The reception ACK file 124 contains a status code indicating the status of the reception of the files. For example, the reception ACK file 124 contains a status code indicating that the reception of the received files 116 has been completed. More specifically, the reception ACK file 124 contains a status code indicating that the received files 116 have been obtained by the apparatus 12. The reception ACK generating unit 40 causes a destination code and date and time information to be included in the reception ACK file 124. The included destination code and date and time information coincide with the destination code and the date and time information included in the files 118, 120, and 122 that make up the received files 116. The reception ACK generating unit 40 further generates the reception ACK token file 123. The reception ACK token file 123 fulfills a role of indicating that writing of the reception ACK file 124 to the reception ACK folder 106 has been completed. Therefore, after the reception ACK file 124 has been written into the reception ACK folder 106, the reception ACK token file 123 is written in the reception ACK folder 106.

FIG. 5B is a diagram showing examples of file names. The file name of the reception ACK file 124 and the file name of the reception ACK token file 123 are shown in FIG. 5B.

As shown in FIG. 5B, the file names can be constituted by a type code, a destination code, date and time information, a management number, and free information. The type code of the reception ACK file 124 is "A". The type code of the reception ACK token file 123 is "X". The destination code and the date and time information in the files 118, 120, and 122, which make up the received files 116, and the destination code and the date and time information in the reception ACK file 124, which is generated when the reception of the received files 116 is completed, coincide with each other. Further, the destination code and the date and time information in the reception ACK token file 123 corresponding to the reception ACK file 124 coincide with the destination code and the date and time information in the reception ACK file 124. The reception ACK file 124 and the reception ACK token file 123 are associated with each other due to the information contained in their file names coinciding with each other.

The writing unit 34 is capable of writing the reception ACK file 124 generated by the reception ACK generating unit 40 into the reception ACK folder 106. Further, the writing unit 34 is capable of writing the reception ACK token file 123 generated by the reception ACK generating unit 40 into the reception ACK folder 106. After the reception ACK file 124 has been written into the reception ACK folder 106, the writing unit 34 writes the reception ACK token file 123 in the reception ACK folder 106.

As noted previously, the apparatus 12 may be equipped with the display control unit 42. The display control unit 42 is capable of controlling a screen display of the display unit 28. The display control unit 42 is capable of displaying a transmission screen in order to carry out transmission of data that serves as the object to be transmitted on the display unit 28. The data that serves as the object to be transmitted can be selected on the transmission screen. Further, an operation in order to transmit the selected data can be performed on the transmission screen. The display control unit 42 is capable of displaying on the display unit 28 information indicating that the transmission of the transmission target files 108 has been completed. Further, the display control unit 42 is capable of displaying on the display unit 28 information indicating that the reception of the received files 116 has been completed.

As noted previously, the adapter device 14 may be equipped with the control unit 66. The control unit 66 administers the control of the adapter device 14 as a whole.

As noted previously, the adapter device 14 may be equipped with the CDX format file acquisition unit 72. The CDX format file acquisition unit 72 confirms at predetermined time intervals whether or not the transmission target file 108 is written into the transmission folder 100. The time interval, for example, is one minute. More specifically, the CDX format file acquisition unit 72 confirms whether or not the transmission token file 114 is written into the transmission folder 100. In the case that the transmission token file 114 is written into the transmission folder 100, the CDX format file acquisition unit 72 makes the following determination. In particular, in such a case, the CDX format file acquisition unit 72 determines that the transmission comment file 110 and the transmission target data file 112 corresponding to the transmission token file 114 are written in the transmission folder 100. Thereafter, the CDX format file acquisition unit 72 reads out the transmission comment file 110 and the transmission target data file 112 that are associated with the transmission token file 114 from the transmission folder 100 together with the transmission token file 114.

Figure 6A:
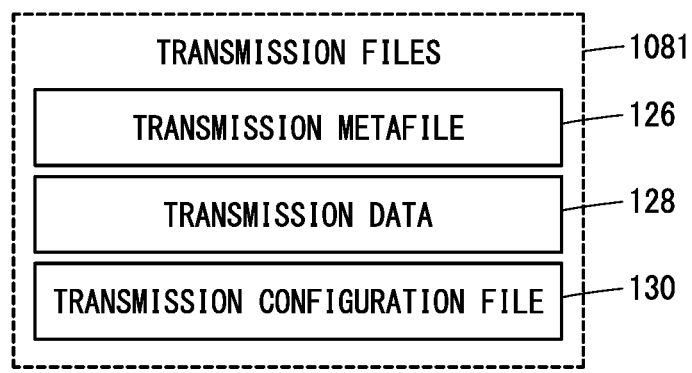
FIG. 6A is a diagram conceptually illustrating transmission files.

As noted previously, the adapter device 14 may be equipped with the comment file analysis unit 74. The comment file analysis unit 74 generates a transmission metafile 126 and a transmission configuration file 130 on the basis of the comment information and the like contained in the transmission comment file 110. FIG. 6A is a diagram conceptually illustrating an example of the transmission files. As shown in FIG. 6A, the transmission files 108₁ can be constituted by the transmission metafile 126, transmission data 128, and the transmission configuration file 130. Transmission command parameters may be included in the transmission metafile 126. Destination information indicating a destination of the transmission files 108₁ may be included in the transmission metafile 126. Further, transmission source information indicating the transmission source of the transmission files 108₁ may be included in the transmission metafile 126. The transmission data 128 may be constituted by the data contained in the transmission target data file 112.

As noted previously, the adapter device 14 may be equipped with the file transmission unit 76. The file transmission unit 76 carries out transmission of the transmission data 128 on the basis of the transmission command parameters contained in the transmission metafile 126, and the information contained in the transmission configuration file 130. The file transmission unit 76 transmits the transmission data 128 to the file exchange device 16 via the communication unit 64. The communication unit 64 carries out communications with the communication unit 96 provided in the file exchange device 16. The communications between the communication unit 64 and the communication unit 96 are performed on the basis of a predetermined communication protocol.

As noted previously, the adapter device 14 may be equipped with the transmission status acquisition unit 78. The transmission status acquisition unit 78 is capable of acquiring transmission status information supplied from the file exchange device 16 via the communication unit 64.

As noted previously, the adapter device 14 may be equipped with the transmission ACK generating unit 80. The transmission ACK generating unit 80 is capable of determining the transmission status concerning the transmission files 108₁ on the basis of the transmission status information acquired by the transmission status acquisition unit 78. On the basis of the transmission status information, the transmission ACK generating unit 80 is capable of determining whether or not the transmission of the transmission files 108₁ to the destination has been completed. In the case it is determined that the transmission of the transmission files 108₁ to the destination has been completed, the transmission ACK generating unit 80 generates the transmission ACK file 115. The transmission ACK generating unit 80 writes the transmission ACK file 115 generated by the transmission ACK generating unit 80 into the transmission ACK folder 102. After the transmission ACK file 115 has been written into the transmission ACK folder 102, the transmission ACK generating unit 80 writes the transmission ACK token file 113 in the transmission ACK folder 102.

The transmission processing unit 68 is constituted by the CDX format file acquisition unit 72, the comment file analysis unit 74, the file transmission unit 76, the transmission status acquisition unit 78, and the transmission ACK generating unit 80. In the case that the transmission target files 108 have been written into the shared directory 98, the transmission processing unit 68 is capable of transmitting the transmission files 108₁ corresponding to the transmission target files 108 to the file exchange device 16 via the communication unit 64.

As noted previously, the adapter device 14 may be equipped with the new arrival information acquisition unit 82. The new arrival information acquisition unit 82 is capable of acquiring new arrival information supplied from the file exchange device 16 via the communication unit 64. The new arrival information is information indicating that the file exchange device 16 has newly received reception files 116₁ that are destined for the apparatus 12.

Figure 6B:
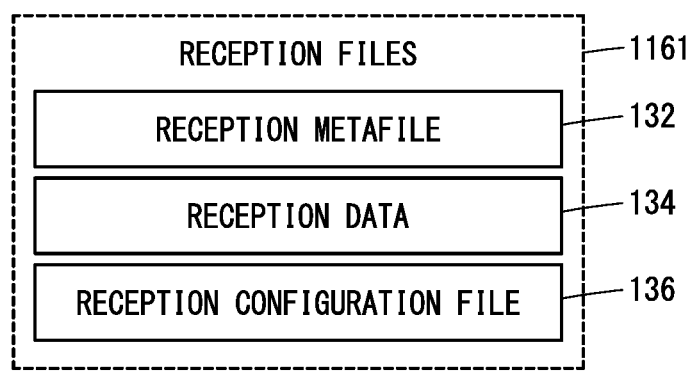
FIG. 6B is a diagram conceptually illustrating reception files.

As noted previously, the adapter device 14 may be equipped with the file reception unit 84. The file reception unit 84 is capable of determining that the file exchange device 16 has newly received the reception files 116₁ destined for the apparatus 12, on the basis of the new arrival information acquired by the new arrival information acquisition unit 82. In the case that the file receiving unit 84 has determined that the file exchange device 16 has newly received the reception files 1161 destined for the apparatus 12, the file reception unit 84 carries out the following process. More specifically, in such a case, the file reception unit 84 receives the reception files 1161 from the file exchange device 16 via the communication unit 64. FIG. 6B is a diagram conceptually illustrating the reception files. As shown in FIG. 6B, the reception files 1161 can be constituted by of a reception metafile 132, reception data 134, and a reception configuration file 136. Reception command parameters may be included in the reception metafile 132. Further, destination information indicating the destination of the reception data 134 may be included in the reception metafile 132. Further, source information indicating the source of the reception data 134 may be included in the reception metafile 132.

As noted previously, the adapter device 14 may be equipped with the CDX format conversion unit 86. The CDX format conversion unit 86 generates the received files 116 which are in a CDX format based on the reception files 1161. The CDX format conversion unit 86 writes the received files 116 that have been generated into the reception folder 104.

As noted previously, the adapter device 14 may be equipped with the reception ACK confirmation unit 88. The reception ACK confirmation unit 88 confirms whether or not the reception ACK token file 123 is written into the reception ACK folder 106. In the case that the reception ACK token file 123 is written into the reception ACK folder 106, the reception ACK confirmation unit 88 reads out the reception ACK file 124 that is written into the reception ACK folder 106. The reception ACK file 124 contains a status code indicating the status of the reception of the files. In the case that the destination code and the date and time information in the reception ACK file 124 coincide with the destination code and the date and time information in the files 118, 120, and 122 that make up the received files 116, and a status code indicating that the reception of the files has been completed is included in the reception ACK file 124, the reception ACK confirmation unit 88 performs the following process. More specifically, in such a case, the reception ACK confirmation unit 88 determines that the reception of the received files 116 corresponding to the reception files 1161 has been completed.

As noted previously, the adapter device 14 may be equipped with the reception status update unit 90. In the case that the reception of the received files 116 corresponding to the reception files 1161 has been completed, the reception status update unit 90 transmits to the file exchange device 16 via the communication unit 64 reception status information indicating that the reception of the received files 116 has been completed. Stated otherwise, the reception status update unit 90 transmits to the file exchange device 16 via the communication unit 64 the reception status information indicating that the reception of the reception files 1161 has been completed.

The reception processing unit 70 is constituted by the new arrival information acquisition unit 82, the file reception unit 84, the CDX format conversion unit 86, the reception ACK confirmation unit 88, and the reception status update unit 90. In the case that the reception processing unit 70 has received the reception files 1161 from the file exchange device 16 via the communication unit 64, the reception processing unit 70 is capable of writing the received files 116 corresponding to the reception files 1161 into the shared directory 98.

Figure 7:
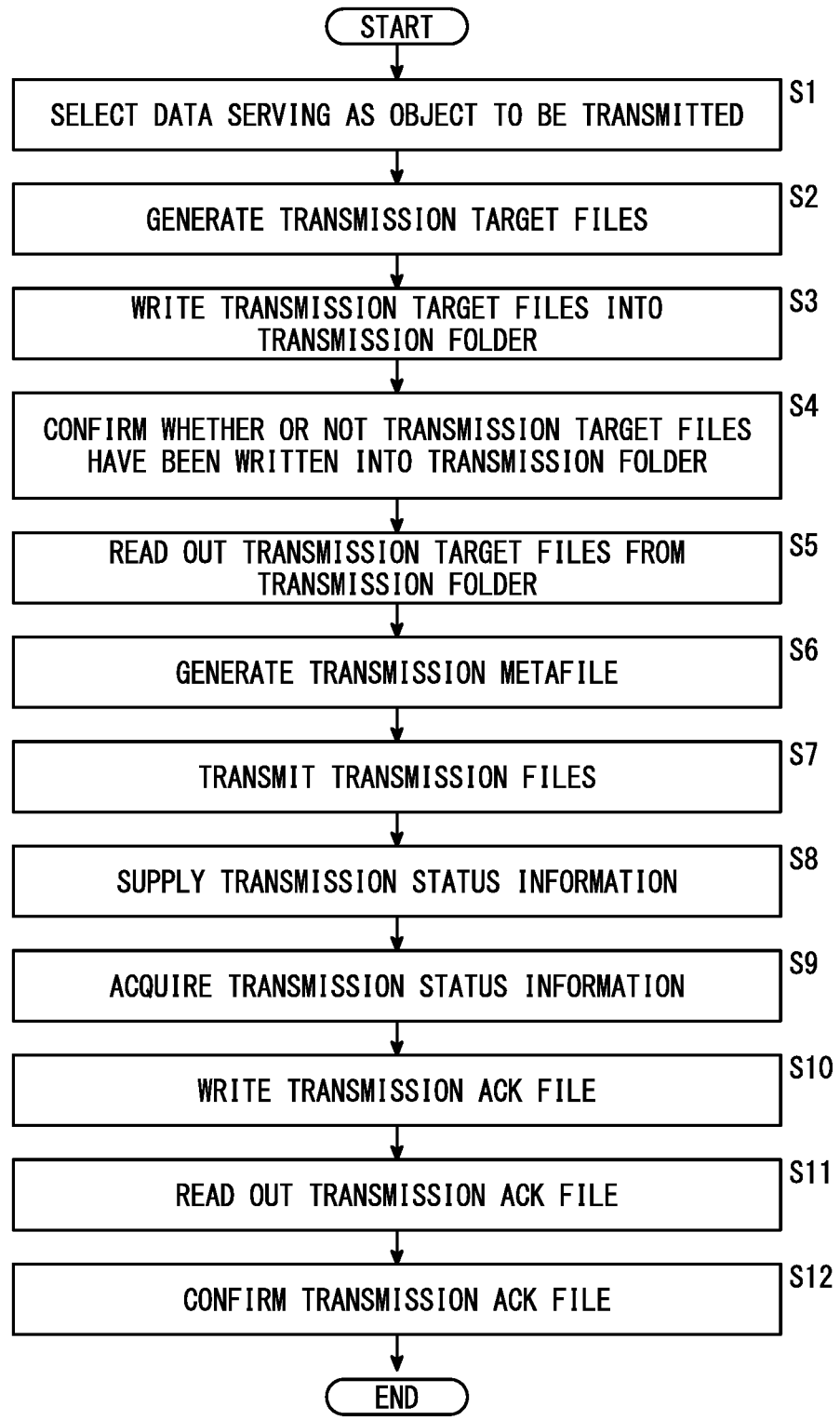
FIG. 7 is a flow chart illustrating an example of operations of the file exchange system according to one embodiment.

Next, a description will be given concerning operations of the file exchange system according to the present embodiment. FIG. 7 is a flow chart illustrating an example of operations of the file exchange system according to the present embodiment. An example of carrying out the transmission of files is shown in FIG. 7.

First, in step S1, the user selects the data that serves as the object to be transmitted. Selection of the data that serves as the object to be transmitted can be performed on a transmission screen displayed on the display unit 28 provided in the apparatus 12. Thereafter, the process transitions to step S2.

In step S2, the CDX format file generating unit 32 provided in the apparatus 12 generates the transmission target files 108. As described above with reference to FIG. 2A, the transmission target files 108 include the transmission comment file 110, the transmission target data file 112, and the transmission token file 114. Thereafter, the process transitions to step S3.

In step S3, the writing unit 34 provided in the apparatus 12 writes the transmission target files 108 into the transmission folder 100. More specifically, the writing unit 34 writes the transmission target files 108 which are in a CDX format into the transmission folder 100. Thereafter, the process transitions to step S4.

In step S4, the CDX format file acquisition unit 72 provided in the adapter device 14 confirms whether or not the transmission target files 108 have been written into the transmission folder 100. In the case that the transmission target files 108 are written into the transmission folder 100, the process proceeds to step S5.

In step S5, the CDX format file acquisition unit 72 reads out the transmission target files 108 from the transmission folder 100. Thereafter, the process transitions to step S6.

In step S6, the comment file analysis unit 74 provided in the adapter device 14 generates the transmission metafile 126 and the transmission configuration file 130 on the basis of the comment information and the like contained in the transmission comment file 110. Thereafter, the process transitions to step S7.

In step S7, the file transmission unit 76 provided in the adapter device 14 carries out transmission of the transmission files 1081 on the basis of the transmission command parameters contained in the transmission metafile 126, and the information contained in the transmission configuration file 130. The file transmission unit 76 transmits the transmission files 1081 to the file exchange device 16 via the communication unit 64 on the basis of the predetermined communication protocol. The destination of the transmission data 128, for example, is the apparatus 18. The control unit 97 provided in the file exchange device 16 transfers the transmission files 1081 supplied from the adapter device 14 to the apparatus 18 via the communication unit 96 and the network 20. Moreover, it should be noted that the transmission files 1081 supplied from the adapter device 14 may be temporarily stored in the storage unit 94 provided in the file exchange device 16. In this manner, the transmission files 1081 are transmitted to the apparatus 18 that is the destination of the transmission files 1081. In the case that the transmission of the transmission files 1081 has been completed, the process transitions to step S8.

In step S8, the control unit 97 supplies the transmission status information, which indicates that the transmission of the transmission files 1081 to the apparatus 18 has been completed, to the adapter device 14 via the communication unit 96. Thereafter, the process transitions to step S9.

In step S9, the transmission status acquisition unit 78 provided in the adapter device 14 acquires the transmission status information, which indicates that the transmission of the transmission files 1081 to the apparatus 18 has been completed. Thereafter, the process transitions to step S10.

In step S10, the transmission ACK generating unit 80 provided in the adapter device 14 generates the transmission ACK file 115. The transmission ACK generating unit 80 further generates the transmission ACK token file 113. The transmission ACK generating unit 80 writes the generated transmission ACK file 115 into the transmission ACK folder 102. After the transmission ACK file 115 has been written into the transmission ACK folder 102, the transmission ACK generating unit 80 writes the transmission ACK token file 113 in the transmission ACK folder 102. Thereafter, the process transitions to step S11.

In step S11, the reading unit 36 provided in the apparatus 12 confirms whether or not the transmission ACK token file 113 is written into the transmission ACK folder 102. In the case that the transmission ACK token file 113 is written into the transmission ACK folder 102, the reading unit 36 reads out the transmission ACK file 115 that is written into the transmission ACK folder 102. Thereafter, the process transitions to step S12.

In step S12, the transmission ACK confirmation unit 38 provided in the apparatus 12 confirms the transmission ACK file 115 that has been read out by the reading unit 36. In the case that the destination code and the date and time information in the transmission ACK file 115 coincide with the destination code and the date and time information in the files 110, 112, and 114 that make up the transmission target files 108, and a status code indicating that the transmission of the files has been completed is included in the transmission ACK file 115, the transmission ACK confirmation unit 38 performs the following process. More specifically, in such a case, the transmission ACK confirmation unit 38 determines that the transmission of the transmission files 1081 corresponding to the transmission target files 108 has been completed.

In this manner, the transmission of the files is carried out.

Figure 8:
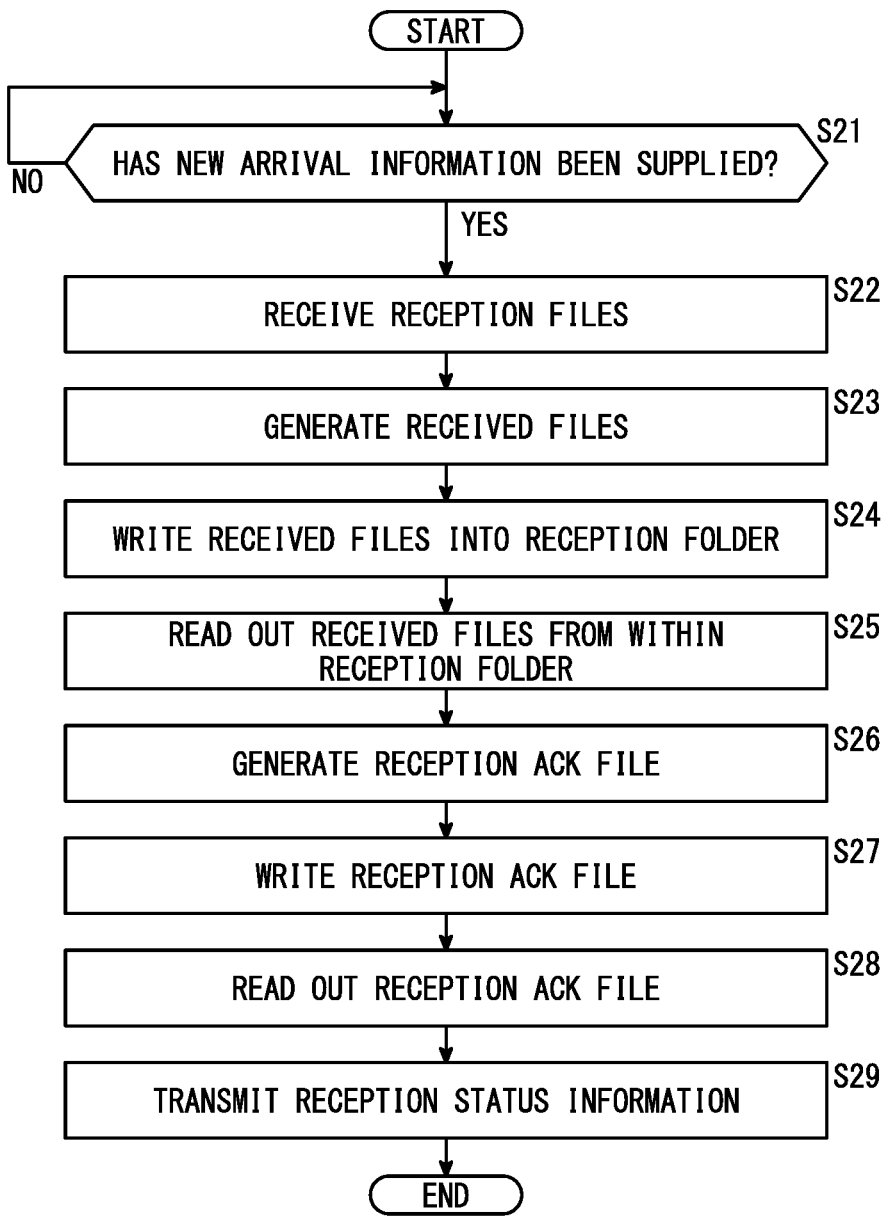
FIG. 8 is a flow chart illustrating an example of operations of the file exchange system according to the one embodiment.

FIG. 8 is a flow chart illustrating an example of operations of the file exchange system according to the present embodiment. An example of carrying out the reception of files is shown in FIG. 8.

In step S21, the new arrival information acquisition unit 82 provided in the adapter device 14 confirms whether or not the new arrival information has been supplied from the file exchange device 16. The new arrival information is information indicating that the file exchange device 16 has newly received reception files 1161 that are destined for the apparatus 12. In the case that the new arrival information is not being supplied from the file exchange device 16 (NO in step S21), then step S21 is repeated. In the case that the new arrival information has been supplied from the file exchange device 16 (YES in step S21), the process transitions to step S22.

In step S22, the file receiving unit 84 provided in the adapter device 14 receives the reception files 1161 from the file exchange device 16. Thereafter, the process transitions to step S23.

In step S23, the CDX format conversion unit 86 provided in the adapter device 14 generates the received files 116 which are in a CDX format on the basis of the reception files 1161. Thereafter, the process transitions to step S24.

In step S24, the CDX format conversion unit 86 provided in the adapter device 14 writes the generated received files 116 into the reception folder 104. Thereafter, the process transitions to step S25.

In step S25, the reading unit 36 provided in the apparatus 12 reads out the received files 116 from within the reception folder 104. Thereafter, the process transitions to step S26.

In step S26, the reception ACK generating unit 40 provided in the apparatus 12 generates the reception ACK file 124 corresponding to the received files 116. The reception ACK generating unit 40 further generates the reception ACK token file 123. Thereafter, the process transitions to step S27.

In step S27, the writing unit 34 provided in the apparatus 12 writes the reception ACK file 124 into the reception ACK folder 106. Thereafter, the writing unit 34 further writes the reception ACK token file 123 into the reception ACK folder 106. Thereafter, the process transitions to step S28.

In step S28, the reception ACK confirmation unit 88 provided in the adapter device 14 confirms whether or not the reception ACK token file 123 is written into the reception ACK folder 106. In the case that the reception ACK token file 123 is written into the reception ACK folder 106, the reception ACK confirmation unit 88 reads out the reception ACK file 124 that is written into the reception ACK folder 106. Thereafter, the process transitions to step S29.

In step S29, the reception status update unit 90 transmits to the file exchange device 16 the reception status information indicating that the received files 116 corresponding to the reception files 1161 have been received by the apparatus 12. Stated otherwise, the reception status update unit 90 transmits to the file exchange device 16 the reception status information indicating that the reception of the reception files 1161 has been completed.

In the forgoing manner, the reception of the files is carried out.

In this manner, transferring of the files is carried out in the shared directory 98 between the apparatus 12 and the adapter device 14. Without communications being performed between the apparatus 12 and the file exchange device 16, communications are performed between the communication unit 64 provided in the adapter device 14 and the file exchange device 16. In the case that the file exchange device 16 is updated, the communication unit 64, which is provided in the adapter device 14, is updated, and updating of the apparatus 12 is not necessary. More specifically, according to the present embodiment, it is possible to cope with the updating of the file exchange device 16 without updating the apparatus 12. The adapter device 14 is provided with respect to each of the plurality of apparatuses 12. When the file exchange device 16 is updated, the adapter devices 14, which are provided for each of the plurality of apparatuses 12, can be updated collectively. According to the present embodiment, when updating of the file exchange device 16 is carried out, since it is unnecessary to update each of the plurality of apparatuses 12 individually, such a feature can contribute to a reduction in the updating cost. In this manner, it is possible to cope in a satisfactory manner with the updating of the file exchange device 16.

Moreover, it should be noted that the present invention is not limited to the embodiments described above, and various configurations can be adopted therein without departing from the essence and gist of the present invention.

The inventions that can be grasped from the above-described embodiments will be described below.

The adapter device (14) includes the communication unit (64) configured to carry out communications with the file exchange device (16) on the basis of the predetermined communication protocol, the transmission processing unit (68) which is configured to transmit, in the case that the transmission target file (108) serving as the object to be transmitted has been written into the shared directory (98), the transmission file (1081) corresponding to the transmission target file to the file exchange device via the communication unit, and the reception processing unit (70) which is configured to write, in the case that the reception file (1161) has been received from the file exchange device via the communication unit, the received file (116) corresponding to the reception file within the shared directory. In accordance with such a configuration, transferring of the files is carried out in the shared directory between the apparatus and the adapter device. Without communications being performed between the apparatus and the file exchange device, communications are performed between the communication unit provided in the adapter device and the file exchange device. In the case that the file exchange device is updated, the communication unit, which is provided in the adapter device, is updated, and updating of the apparatus is not necessary. More specifically, in accordance with such a configuration, it is possible to update the file exchange device without updating the apparatus. The adapter device is provided with respect to each of the plurality of devices. When the file exchange device is updated, the adapter devices, which are provided for each of the plurality of devices, can be updated collectively. In accordance with such a configuration, when updating of the file exchange device is carried out, since it is unnecessary to update each of the plurality of devices individually, such a feature can contribute to a reduction in the updating cost. In accordance with such a configuration, it is possible to cope in a satisfactory manner with the updating of the file exchange device.

The transmission target files may be written into the transmission folder (100) that is provided within the shared directory.

The received files may be written into the reception folder (104) that is provided within the shared directory.

The transmission target files may include the destination information indicating the destination of the transmission file.

The received files may include the transmission source information indicating the transmission source of the received file.

The transmission target files may include the transmission target data file (112) containing the transmission target data that serves as the object to be transmitted, the transmission comment file (110) associated with the transmission target data file and including the comment regarding the transmission target data, and the transmission token file (114) associated with the transmission target data file and including the token.

The received files may include the received data file (120) containing the received data which is data that has been received, the reception comment file (118) associated with the received data file and including the comment regarding the received data, and the reception token file (122) associated with the received data file and including the token.

The file exchange system (10) is configured to carry out transmission and reception of files between the one user and the other user using the file exchange device, and includes the apparatus (12) operated by the one user, and the adapter device including the communication unit configured to carry out communications with the file exchange device on the basis of the predetermined communication protocol, wherein the apparatus is equipped with the writing unit (34) configured to write the transmission target file, which is the file serving as the object to be transmitted, in the shared directory, and the adapter device is equipped with the transmission processing unit which is configured to transmit, in the case that the transmission target file has been written into the shared directory, the transmission file corresponding to the transmission target file to the file exchange device via the communication unit.

The adapter device may further include the reception processing unit which is configured to write, in the case that the reception file has been received from the file exchange device via the communication unit, the received file corresponding to the reception file within the shared directory, and the apparatus further includes the reading unit (36) configured to read out the received file written into the shared directory.

In the file exchange method, there is included the step (step S4) of confirming whether or not the transmission target file serving as the object to be transmitted has been written into the shared directory, and the step (step S7) of transmitting, in the case that the transmission target file has been written into the shared directory, the transmission file corresponding to the transmission target file to the file exchange device via the communication unit on the basis of the predetermined communication protocol.

There may further be included the step (step S22) of receiving the reception file from the file exchange device via the communication unit on the basis of the communication protocol, and the step (step S24) of writing, in the case that the reception file has been received from the file exchange device via the communication unit, the received file corresponding to the reception file within the shared directory.

In the computer-readable non-transitory storage medium having the program stored therein, the program is stored in order to cause the computer to execute a process including the step of confirming whether or not the transmission target file serving as the object to be transmitted has been written into the shared directory, and the step of transmitting the transmission file corresponding to the transmission target file to the file exchange device via the communication unit on the basis of the predetermined communication protocol, in the case that the transmission target file has been written into the shared directory.

The computer may be caused to further execute a process including the step of receiving the reception file from the file exchange device via the communication unit on the basis of the communication protocol, and the step of writing the received file corresponding to the reception file within the shared directory, in the case that the reception file has been received from the file exchange device via the communication unit.

The present invention is not limited to the above disclosure, and various modifications are possible without departing from the essence and gist of the present invention.

What is claimed is:

1. An adapter device of a file exchange system, comprising:
   a first apparatus operated by one user;
   a second apparatus operated by another user;
   a file exchange device used for transmission and reception of files between the first apparatus and the second apparatus; and
   an adapter device configured to communicate with the file exchange device on a bases of a predetermined communication protocol, the adapter device comprising one or more processors that execute computer-executable instructions stored in a memory, wherein the one or more processors execute the computer-executable instructions to cause the adapter device to:

transmit, in a case that a transmission target file serving as an object to be transmitted has been written into a shared directory accessible by the first apparatus operated by the one user and inaccessible by the second apparatus operated by the another user, a transmission file corresponding to the transmission target file to the file exchange device; and write, in a case that a reception file has been received from the file exchange device, a received file corresponding to the reception file within the shared directory, wherein the shared directory is inaccessible by the file exchange device, transmission and reception of files between the file exchange device and the first apparatus is performed via the shared directory and the adapter device, the transmission target file to be written within the shared directory is caused, by the first apparatus, to include a transmission comment file including destination information indicating a destination of the transmission file, when the transmission file is to be transmitted to the second apparatus, the destination information indicating that the second apparatus is the destination of the transmission file is caused, by the first apparatus, to be included in the transmission comment file and the destination information is extracted by the adapter device from the transmission comment file for use in determining the second apparatus, and a transmission metafile including the extracted destination information is caused, by the adapter device, to be included in the transmission file.

2. The adapter device according to claim 1, wherein the transmission target file is written into a transmission folder provided within the shared directory.

3. The adapter device according to claim 1, wherein the received file is written into a reception folder provided within the shared directory.

4. The adapter device according to claim 1, wherein the received file includes transmission source information indicating a transmission source of the received file.

5. The adapter device according to claim 1, wherein the transmission target file includes a transmission target data file containing transmission target data that serves as an object to be transmitted, a transmission comment file associated with the transmission target data file and including a comment regarding the transmission target data, and a transmission token file associated with the transmission target data file and including a token.

6. The adapter device according to claim 1, wherein the received file includes a received data file containing received data which is data that has been received, a reception comment file associated with the received data file and including a comment regarding the received data, and a reception token file associated with the received data file and including a token.

7. A file exchange system comprising:
a first apparatus operated by one user;
a second apparatus operated by another user;
a file exchange device used for transmission and reception of files; and
an adapter device configured to communicate with the file exchange device on a basis of a predetermined communication protocol,
wherein the first apparatus comprises one or more processors that execute computer-executable instructions stored in a memory, wherein the one or more processors execute the computer-executable instructions to cause the apparatus to write a transmission target file, which is a file serving as an object to be transmitted, in a shared directory accessible by the first apparatus operated by the one user and inaccessible by the second apparatus operated by the another user;

the adapter device comprises one or more processors that execute computer-executable instructions stored in a memory, wherein the one or more processors of the adapter device execute the computer-executable instructions to cause the adapter device to transmit, in a case that the transmission target file has been written into the shared directory, a transmission file corresponding to the transmission target file to the file exchange device, wherein the shared directory is inaccessible by the file exchange device, transmission and reception of files between the file exchange device and the first apparatus is performed via the shared directory and the adapter device, the transmission target file to be written within the shared directory is caused, by the first apparatus, to include a transmission comment file including destination information indicating a destination of the transmission file, when the transmission file is to be transmitted to the second apparatus, the destination information indicating that the second apparatus is the destination of the transmission file is caused, by the first apparatus, to be included in the transmission comment file and the destination information is extracted by the adapter device from the transmission comment file for use in determining the second apparatus, and a transmission metafile including the extracted destination information is caused, by the adapter device, to be included in the transmission file.

8. The file exchange system according to claim 7, wherein:
the one or more processors of the adapter device further cause the adapter device to write, in a case that a reception file has been received from the file exchange device, a received file corresponding to the reception file within the shared directory; and
the one or more processors of the apparatus further cause the first apparatus to read out the received file written into the shared directory.

9. A file exchange method for a file exchange system, the file exchange system comprising: a first apparatus operated by one user, a second apparatus operated by another user; a file exchange device used for transmission and reception of files; and an adapter device configured to communicate with the file exchange device on a bases of a predetermined communication protocol, the file exchange method comprising:

confirming whether or not a transmission target file serving as an object to be transmitted has been written into a shared directory accessible by the first apparatus operated by the one user and inaccessible by the second apparatus operated by the another user; and transmitting, in a case that the transmission target file has been written into the shared directory, a transmission file corresponding to the transmission target file to a file exchange device on a basis of a predetermined communication protocol, wherein the shared directory is inaccessible by the file exchange device, transmission and reception of files between the file exchange device and the first apparatus is performed via the shared directory and the adapter device, the transmission target file to be written within the shared directory is caused, by the first apparatus, to include a transmission comment file including destination information indicating a destination of the transmission file, when the transmission file is to be transmitted to the second apparatus, the destination information indicating that the second apparatus is the destination of the transmission file is caused, by the first apparatus, to be included in the transmission comment file and the destination information is extracted by the adapter device from the transmission comment file for use in determining the second apparatus, and a transmission metafile including the extracted destination information is caused, by the adapter device, to be included in the transmission file.

10. The file exchange method according to claim 9, further comprising:

receiving a reception file from the file exchange device on a basis of a communication protocol; and writing, in a case that the reception file has been received from the file exchange device, a received file corresponding to the reception file within the shared directory.

11. A computer-readable non-transitory storage medium used in a file exchange system comprising: a first apparatus operated by one user; a second apparatus operated by another user; a file exchange device user for transmission and reception of files; and an adapter device configured to communicate with the file exchange device on a bases of a predetermined communication protocol, the computer-readable non-transitory storage medium having a program stored therein in order to cause a computer to execute a process comprising:

confirming whether or not a transmission target file serving as an object to be transmitted has been written into a shared directory accessible by the first apparatus operated by the one user and inaccessible by the second apparatus operated by the another user; and transmitting, in a case that the transmission target file has been written into the shared directory, a transmission file corresponding to the transmission target file to a file exchange device on a basis of a predetermined communication protocol, wherein the shared directory is inaccessible by the file exchange device, transmission and reception of files between the file exchange device and the first apparatus is performed via the shared directory and the adapter device, the transmission target file to be written within the shared directory is caused, by the first apparatus, to include a transmission comment file including destination information indicating a destination of the transmission file, when the transmission file is to be transmitted to the second apparatus, the destination information indicating that the second apparatus is the destination of the transmission file is caused, by the first apparatus, to be included in the transmission comment file and the destination information is extracted by the adapter device from the transmission comment file for use in determining the second apparatus, and a transmission metafile including the extracted destination information is caused, by the adapter device, to be included in the transmission file.

12. The storage medium according to claim 11, wherein the program causes the computer to further execute a process comprising:

receiving a reception file from the file exchange device on a basis of a communication protocol; and writing, in a case that the reception file has been received from the file exchange device, a received file corresponding to the reception file within the shared directory.

* * * * *